(12) United States Patent
McDonnell

(10) Patent No.: US 12,296,243 B2
(45) Date of Patent: May 13, 2025

(54) GOLF CLUB FITTING SYSTEMS AND METHODS

(71) Applicant: Cobra Golf Incorporated, Carlsbad, CA (US)

(72) Inventor: Michael T. McDonnell, Carlsbad, CA (US)

(73) Assignee: Cobra Golf Incorporated, Carlsbad, CA (US)

( * ) Notice: Subject to any disclaimer, the term of this patent is extended or adjusted under 35 U.S.C. 154(b) by 395 days.

(21) Appl. No.: 17/747,226

(22) Filed: May 18, 2022

(65) Prior Publication Data

US 2024/0091610 A1    Mar. 21, 2024

Related U.S. Application Data

(60) Provisional application No. 63/329,785, filed on Apr. 11, 2022.

(51) Int. Cl.
| | | |
|---|---|---|
| G06Q 20/00 | (2012.01) | |
| A63B 60/42 | (2015.01) | |
| G06Q 20/36 | (2012.01) | |
| G06Q 20/38 | (2012.01) | |
| H04L 9/00 | (2022.01) | |
| H04L 9/32 | (2006.01) | |

(52) U.S. Cl.
CPC ......... *A63B 60/42* (2015.10); *G06Q 20/3674* (2013.01); *G06Q 20/3825* (2013.01); *H04L 9/3213* (2013.01); *H04L 9/50* (2022.05); *G06Q 2220/00* (2013.01); *H04L 2209/56* (2013.01)

(58) Field of Classification Search
CPC .. A63B 60/42; A63B 53/005; G06Q 20/3674; G06Q 20/3825; G06Q 2220/00; G06Q 20/322; G06Q 30/0621; G06Q 30/06; H04L 9/3213; H04L 9/50; H04L 2209/56
USPC ................. 705/16, 21, 59; 380/44, 262, 278
See application file for complete search history.

(56) References Cited

U.S. PATENT DOCUMENTS

| | | |
|---|---|---|
| 8,636,603 B2 | 1/2014 | Rauchholz |
| 8,641,546 B2 | 2/2014 | Rauchholz |
| 8,641,547 B2 | 2/2014 | Rauchholz |
| 8,641,548 B2 | 2/2014 | Rauchholz et al. |
| 9,195,781 B2 | 11/2015 | Savarese et al. |
| 9,427,639 B2 | 8/2016 | Rauchholz et al. |
| 11,135,495 B2 | 10/2021 | Tuxen et al. |
| 11,648,443 B2 | 5/2023 | Wycoff |
| 2014/0221118 A1 | 8/2014 | Meadows et al. |
| 2022/0284628 A1* | 9/2022 | Tuxen ................ A63B 71/0616 |
| 2024/0293698 A1 | 9/2024 | Wycoff |

FOREIGN PATENT DOCUMENTS

EP    2803062 B1    6/2017

* cited by examiner

*Primary Examiner* — Dante Ravetti
(74) *Attorney, Agent, or Firm* — Quarles & Brady LLP

(57) ABSTRACT

A method of golf club fitting comprises providing a fitting system including a computing device that is in communication with a blockchain over a communication network, at least one sensor, and at least one golf club. Further, the method comprises collecting fit data associated with the at least one golf club, generating a non-fungible token including metadata and a digital object, configuring the non-fungible token to include at least one function, minting the non-fungible token to the blockchain network, and triggering the at least one function.

7 Claims, 8 Drawing Sheets

GOLF CLUB FITTING SYSTEMS AND METHODS

CROSS-REFERENCE TO RELATED APPLICATIONS

This application claims the benefit of priority of U.S. Provisional App. No. 63/329,785, filed on Apr. 11, 2022, which is incorporated by reference in its entirety herein.

BACKGROUND

Golfers at any level of experience or skill may be fitted for golf clubs. Often the fitting process takes place in-person at a sporting goods store or a specialized fitting location where trained personnel, i.e., fitters, employ various methodologies to collect and analyze information about the golfer and to provide recommendations for the golfer in selecting golf clubs. There exists a continuing need for improvement in the field of golf club fitting.

SUMMARY

In accordance with some embodiments of the disclosed subject matter, systems, methods, and media for golf club fitting systems and methods using cryptographic tokens, e.g., non-fungible tokens, are provided.

In some aspects, a method of golf club fitting comprises providing a fitting system including a computing device that is in communication with a blockchain over a communication network, at least one sensor, and at least one golf club. Further, the method comprises collecting fit data associated with the at least one golf club, generating a non-fungible token including metadata and a digital object, configuring the non-fungible token to include at least one function, minting the non-fungible token to the blockchain network, and triggering the at least one function.

In some embodiments, the fit data is captured by the at least one sensor as a user swings the golf club. In some embodiments, the at least one function of the non-fungible token includes executing a commission amount. In some embodiments, updating the metadata of the non-fungible token includes linking the non-fungible token to a purchase of a golf club or set of clubs. In some embodiments, the fit data includes a time, a date, fitter information, and user identification. In some embodiments, the blockchain is private. In some embodiments, the non-fungible token is transferred to a user.

In some aspects, a method of golf club fitting comprises providing an online platform that is displayed on a user interface of a user device. The user device is in communication with a blockchain over a communication network. The method further comprises receiving fit data captured by the user device as a user swings a golf club, converting the fit data to at least one fit attribute, calculating a rarity score based on at least one fit attribute and a corresponding sample set of attributes, generating a digital object based on the fit attributes and the rarity score, and minting a non-fungible token with the digital object to the blockchain.

In some embodiments, the user device includes at least one sensor that is configured to capture the fit data. In some embodiments, the rarity score is a statistical comparison of the at least on fit attribute to the corresponding sample set of attributes. In some embodiments, the rarity score is a plurality of percentages. In some embodiments, the digital object includes a plurality of traits that are determined based on the rarity score. In some embodiments, fit data comprises swing velocity, a golf club type, and a shot distance.

In some aspects, a golf club fitting system includes a computing device that is in communication with a blockchain over a communication network, at least one sensor that is in communication with the computing device over the communication network, and a user device that is in communication with the blockchain over the communication network. The at least one sensor is configured to capture fit data associated with a golf club fitting process. Additionally, a non-fungible token is minted to the blockchain with metadata including at least a portion of the fit data.

In some embodiments, the golf club fitting system further comprises a screen that is configured to display a virtual golf course. In some embodiments, the at least one sensor is attached to a golf club. In some embodiments, the user device is a smartphone. The non-fungible token includes a digital object. In some embodiments, the metadata of the non-fungible token includes all of the fit data. In some embodiments, a fitter operates the fitting system for a user.

In some aspects, a method of golf club fitting includes providing a fitting system including a computing device that is in communication with a blockchain over a communication network, at least one sensor, and at least one golf club. The method further comprises linking a digital wallet associated with a user to an online platform, collecting fit data associated with a user and the at least one golf club, and generating a non-fungible token including metadata and a digital object. The non-fungible token is configured to include at least one function. Further, the method comprises minting the non-fungible token to the blockchain, transferring the non-fungible token to the digital wallet associated with the user, and triggering the at least one function.

In some embodiments, the fit data is captured by the at least one sensor as a user swings the golf club. In some embodiments, the at least one function of the non-fungible token includes executing a commission amount. In some embodiments, triggering the at least one function includes linking the non-fungible token to a purchase of a golf club or set of clubs and updating the metadata. In some embodiments, the purchase of the golf club or set of clubs occurs through the online platform. In some embodiments, the commission amount is restricted from modification by an unauthorized party. In some embodiments, the blockchain is private.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
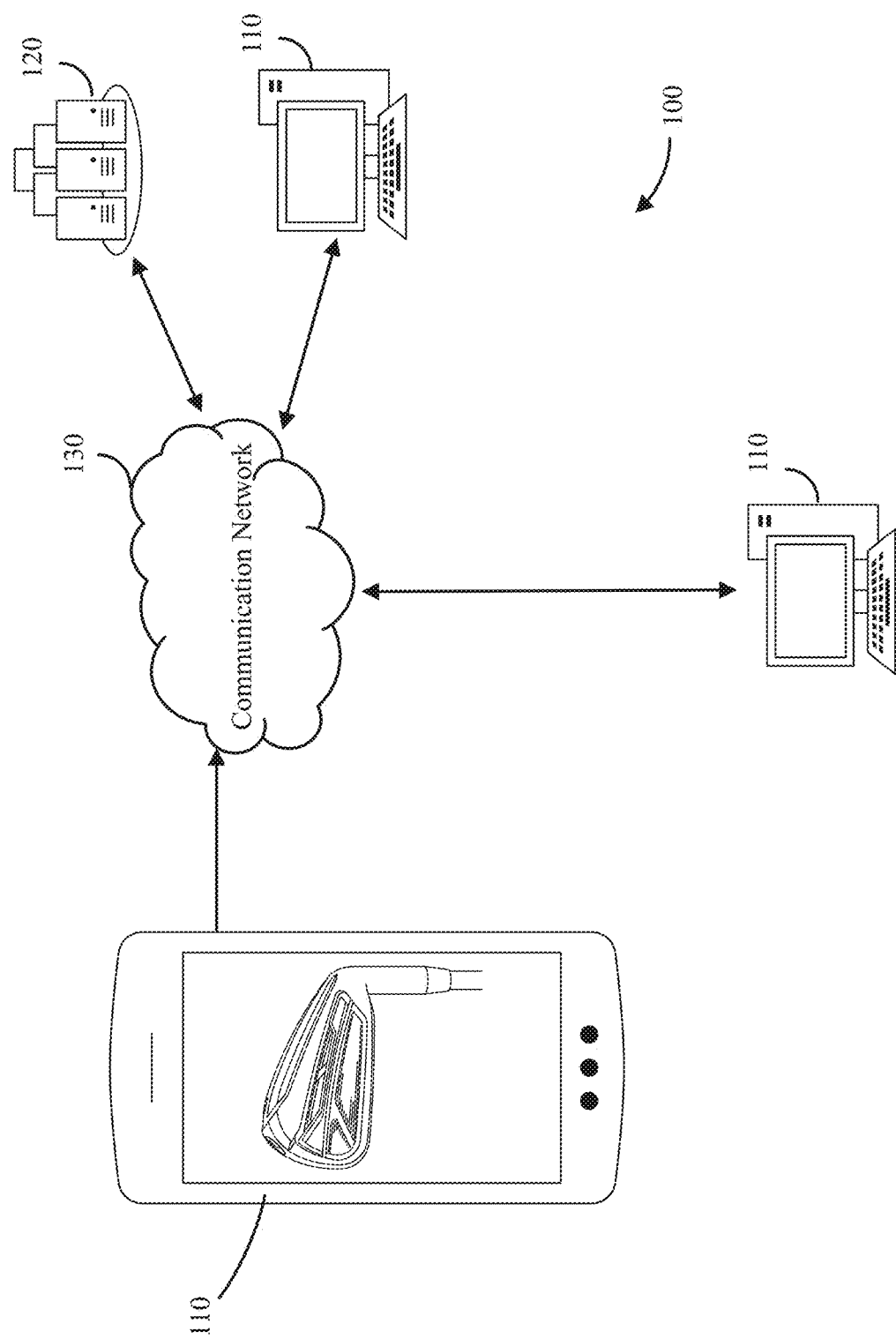
FIG. 1 depicts an example of a system for generating a non-fungible token in accordance with some embodiments of the disclosed subject matter.

The present application includes embodiments of mechanisms (e.g., systems, methods, and media) for generating digital assets authorized by cryptographic tokens, e.g., non-fungible tokens (NFTs), and which correspond to physical objects (e.g., golf clubs, articles of apparel, or articles of footwear), or which are associated with a golf club fitting process or system. In some embodiments, this disclosure relates to cryptographic digital assets for articles or objects, such as, e.g., tangible objects, including golf clubs, golf bags, footwear, apparel, headgear, or sporting gear, among other products, such as, e.g., watches, luggage, jewelry, storage or shipping containers, artwork, mobile phones or smartphones, tablets, televisions or other electronic devices, refrigerators or other appliances, and vehicles or other machines, or the articles or objects may be intangible objects, including graphic designs, virtual avatars or characters, graphic user interfaces, or other forms of communication.

Further, this disclosure relates to cryptographic digital assets associated with golf club fitting processes and systems, and methods for provisioning of such cryptographic digital assets and articles, and decentralized computing systems with attendant blockchain control logic for mining, exchanging, collaborating, modifying, combining, and/or blending blockchain-enabled digital assets and articles. The presently described technology relies on the trust established in and by blockchain technology to enable a company to control the creation, distribution, expression, and use of digital objects that represent their brand. Unlike typical digital assets that are freely reproducible without loss of content or quality, the use of discrete recordation of ownership via blockchain technology eliminates the ability for simple digital reproductions of the digital objects. In doing so, the manufacturer has the ability to control or limit the overall supply of the digital objects or traits/aspects thereof and may create a controlled scarcity if so desired. The present disclosure contemplates that, in some examples, the digital object may be representative of: a physical object offered for sale; a 2D or 3D design rendering or design file that may be suitable for future production; a virtual representation of an object that is not presently intended for physical creation/production; or other such objects. Further, some embodiments of the present disclosure include mechanisms for generating cryptographic tokens using virtual reality (VR), augmented reality (AR), and/or graphical user interfaces (GUIs) on computing devices.

The present application further discloses mechanisms that bridge the divide between the physical world and the digital realm. For example, according to some embodiments of the present disclosure, individuals customize a digital product, mint an NFT of the digital product, and receive a physical product corresponding to both the digital product and the NFT. In some examples, individuals purchase a physical product, receive a digital product corresponding with the physical product, and an NFT is minted of the digital product. As another example, users may participate in a golf club fitting process that uses a fitting system, and the users may receive an NFT that is minted with metadata based on data collected throughout the fitting process.

By way of example, and not limitation, there are presented cryptographic digital assets that are provisioned through a blockchain ledger of transaction blocks and function, in part, to connect a real-world product, such as a physical golf club or set of clubs, to a virtual collectable, such as a digital golf club or set of clubs. As used herein, the term "user" is inclusive of a consumer, a purchaser, and a registered member of an online platform. When a consumer buys a genuine golf club, a digital representation of a club may be generated, linked with the consumer, and assigned a cryptographic token, where the digital club and cryptographic token collectively represent a club NFT. The digital representation may include a computer-generated avatar of a club or a limited-edition artist rendition of the club. The digital asset may be authorized by an encryption-protected block that contains a hash pointer as a link to a related block in a decentralized blockchain, a transaction timestamp, and transaction data. Using the digital asset, the buyer is enabled to securely trade or sell the tangible club, trade or sell the digital club, store the digital club in a cryptocurrency wallet or other digital blockchain wallet, and, based on rules of acceptable club manufacturability, create a custom, made-as-new, tangible club.

Further, users can develop a personal user account that is registered with the original manufacturer of the tangible golf clubs, e.g., a Cobra Fam account, which is linked to the user's cryptographic wallet and allows the user access to a platform for viewing, purchasing, selling, trading, minting, and burning digital assets and associated cryptographic tokens that may or may not be linked to or representative of tangible goods.

As used herein, "cryptographic digital assets," or simply "digital assets" may refer to any computer-generated virtual object, including digital clubs, club sets, golfing gear, footwear, apparel, headgear, avatars, art, collectables, tickets, coins, creatures, or sub-elements thereof, etc., among other virtual objects, that have a unique, non-fungible tokenized code ("token") registered on and validated by a blockchain platform or otherwise registered in an immutable database. Further, the digital asset may be a digital-art version of a tangible, physical object or an object disassociated with tangible, physical objects. For example, the digital asset may be a digital-art version of physical golf clubs having the same or substantially the same appearance. Alternatively, the digital asset may be digital golf clubs generated within the physical realm and without being connected to or representative of physical golf clubs. Further, the digital asset may become physical through various techniques, such as by manufacturing methods based on aspects of the digital golf clubs that are taken as inputs to create the physical golf clubs.

As used herein, the term "cryptographic token" is a digital unit of value that is stored/recorded on a blockchain. Cryptographic tokens include payment tokens, such as coins (e.g., Bitcoin), utility tokens, security tokens, and non-fungible tokens. As used herein, "non-fungible token" or "NFT" refers to a cryptoasset in the form of a unique, cryptographic token corresponding to a computer-generated virtual object, including digital golf clubs, digital articles of footwear, and/or digital articles of apparel. The NFT may be a blockchain-based deed of digital ownership and/or certificate of authenticity. The NFT can be built in accordance with contemporary and relevant standards, such as, e.g., an Ethereum Request for Comments (ERC) 721 (Non-Fungible Token Standard) or ERC1155 (Multi Token Standard) among other relevant standards and as appropriate for the particular blockchain network and applications used therewith. Further, an NFT is built on a "smart contract" that has particular conditions and terms attached to it for dictating various features and transactions associated with the NFT, which can impact the value or, at least, the perceived value of the NFT over time. In essence, the NFT represents authentication of the transaction and serves as a record of this authentication on a blockchain ledger (e.g., Bitcoin, Ethereum, and the like). As such, the NFT itself may fluctuate in value depending on various aspects of the transaction, e.g., the parties involved, value exchanged, time and/or date, exclusivity, or combinations thereof, among other factors. Further, the number and/or frequency of transactions may also cause the NFT to fluctuate in value.

A "smart contract" is generally understood as an agreement that is in the form of a self-enforcing software program that runs on the blockchain network, so it is stored on a public database and is itself immutable. However, the terms within a smart contract, such as one in an NFT, are dictated by one or more of the parties. When creating a smart contract, a party or multiple parties may include programming to allow for negotiation, modification, full or partial acceptance, full or partial refusal, and, ultimately, full or partial enforcement or waiver. It will be appreciated that, as used herein, consideration is merely something of value given in exchange from one party to the other and may be real or personal property, such as, e.g., currency, or may be a return promise, an act, or forbearance. Additionally, options are contracts in which an offeree gives consideration for a promise by the offeror not to revoke an outstanding offer, and options can be provided as part of a larger contract or, alternatively, the option may be the foundation of the contract itself. A smart contract in an NFT may, but need not, be legally enforceable.

Some embodiments of the present disclosure are directed to computer-generated virtual or digital collectables or assets, such as digital golf clubs, or digital articles of apparel (e.g., jackets, shirts, pants, shorts, hats, necklaces, watches). According to some embodiments, the digital collectables may be secured and/or uniquely identified by a cryptographic token, e.g., an NFT. The digital asset may be linked and/or distributed with real-world, physical products, such as tangible golf clubs and/or tangible articles of apparel. The digital assets may be linked or distributed with a 2D or 3D design file such as a computer-aided design (CAD) model, graphical rendering, image, or drawings package from which a physical product may be constructed or otherwise represented.

NFTs can be created, recorded, or "minted" into the blockchain ledger stored in the blockchain network, and thereby stored in memory of one or more of the blockchain nodes. Further, such cryptographic tokens can be destroyed or "burned" by permanent removal from circulation in the blockchain network. Burning can be accomplished in a variety of ways, including by transferring ownership of the cryptographic token to a general, null address that is inaccessible and unowned. Alternatively, burning can be accomplished by modification or destruction of metadata, e.g., a uniform resource locator (URL), included with the cryptographic token. Manufacturers, also referred to herein as brands or organizations, may burn cryptographic tokens to create scarcity within the marketplace, or to trigger a condition, or as a result of a condition, or for security purposes. For example, a brand may release, e.g., "drop," a collection of digital assets secured or identified by cryptographic tokens, and then may burn any unsold cryptographic tokens within the collection to preserve exclusivity of those sold. In another example, a brand may drop a collection of digital assets secured or identified by NFTs with the condition that purchasers may only have access to their purchased digital asset when all or a particular quantity of the collection has been purchased, which may be expedited by the brand then burning unsold NFTs to meet the condition prematurely.

There are several ways a user can be enabled to unlock or acquire a cryptographic asset. In one example, upon scanning the physical golf club at a point-of-sale (POS) terminal during first purchase, a unique NFT and corresponding private key are automatically generated and assigned to the user's blockchain wallet. In another example, a private key is provided to the user via a printed or digital receipt, a visual or electronic ID tag (RFID or NFC) hidden in or applied to the physical golf club, a pop-up message or email sent to a personal user account, a push notification or text message sent to a smartphone, or some other record; the consumer uses the private key to link the cryptographic asset to their digital blockchain wallet. Another example may require the user to assemble the private key in part via a physical code or Unique Product Identifier (UPID), e.g., a serial number, associated with the golf club (on the packaging or box, on a hang tag, under a label, embedded within a QR code on the physical golf club or packaging, embedded within a club head or shaft, etc.) and in part via a transaction authentication code (i.e., to prevent a consumer from collecting a cryptographic asset while merely handling golf clubs in a store).

Another example may require the user to "seek" cryptographic assets in stores, whether physical stores or virtual stores inside a metaverse or game, by using a photographic capture function or augmented reality ("AR") function on a handheld personal computing device. For this method, a private key may be provided via the validated transaction, however, the user must separately find a hidden cryptographic asset in an AR hidden within the store or local area before the digital asset can be transferred to their wallet (i.e., the cryptographic key and the virtual object must both be separately acquired before the transfer occurs).

In a representative example, an authenticated golf club or set is created and assigned a UPID. Upon purchase by a consumer, the UPID may be used to unlock a cryptographic digital asset composed of a collectable digital golf club and a unique non-fungible token (NFT) operating on a blockchain based distributed computing platform. In general, a consumer must have or procure a blockchain wallet address (e.g., an Ethereum hardware wallet) to purchase, unlock, or acquire a cryptographic asset. The blockchain wallet may be used to store a private key belonging to the cryptographic asset and may be linked to a personal account that is registered with the original manufacturer of the physical golf club.

In some instances, the cryptographic asset may not be originally linked to a physical product, but instead may be gifted or sold as part of a brand promotion campaign, event, moment, or experience. In some instances, the brand may host or commission a raffle, a game, a contest or other virtual promotion campaigns, events, moments, or experiences for which digital assets may be gifted or sold, or for which NFTs may be generated as proof of attendance or as tickets for entry, among other examples.

FIG. 1 illustrates an example system 100 for generating an NFT corresponding to a paired digital and physical golf club in accordance with some embodiments of the disclosed subject matter. As shown in FIG. 1, the system may include one or more computing devices or user devices 110, and one or more servers 120. The digital golf club may include a toe, a heel, a topline or a crown, a sole, a shaft, a hosel, a strike face, a medallion, and a weight insert (not shown).

Still referring to FIG. 1, the one or more computing devices 110 can receive data corresponding to one or more digital golf clubs. Additionally, or alternatively, the one or more computing devices 110 can receive input data from a user that correspond to attributes of one or more digital golf clubs. The one or more computing devices 110 can execute at least a portion of the system 100 to generate one or more NFTs corresponding to the one or more digital golf clubs Additionally, or alternatively, the one or more computing devices 110 can communicate data corresponding to the one or more digital golf clubs to one or more servers 120 over one or more communication networks or connections 130.

The one or more servers 120 can execute at least a portion of the system 100. In such embodiments, the one or more servers 120 can receive data corresponding to one or more digital golf clubs. Additionally, or alternatively, the one or more servers 120 can receive input from a user that correspond to attributes of one or more digital golf clubs. The one or more servers 120 can execute at least a portion of the system 100 to generate one or more NFTs corresponding to the one or more digital golf clubs.

Figure 2:
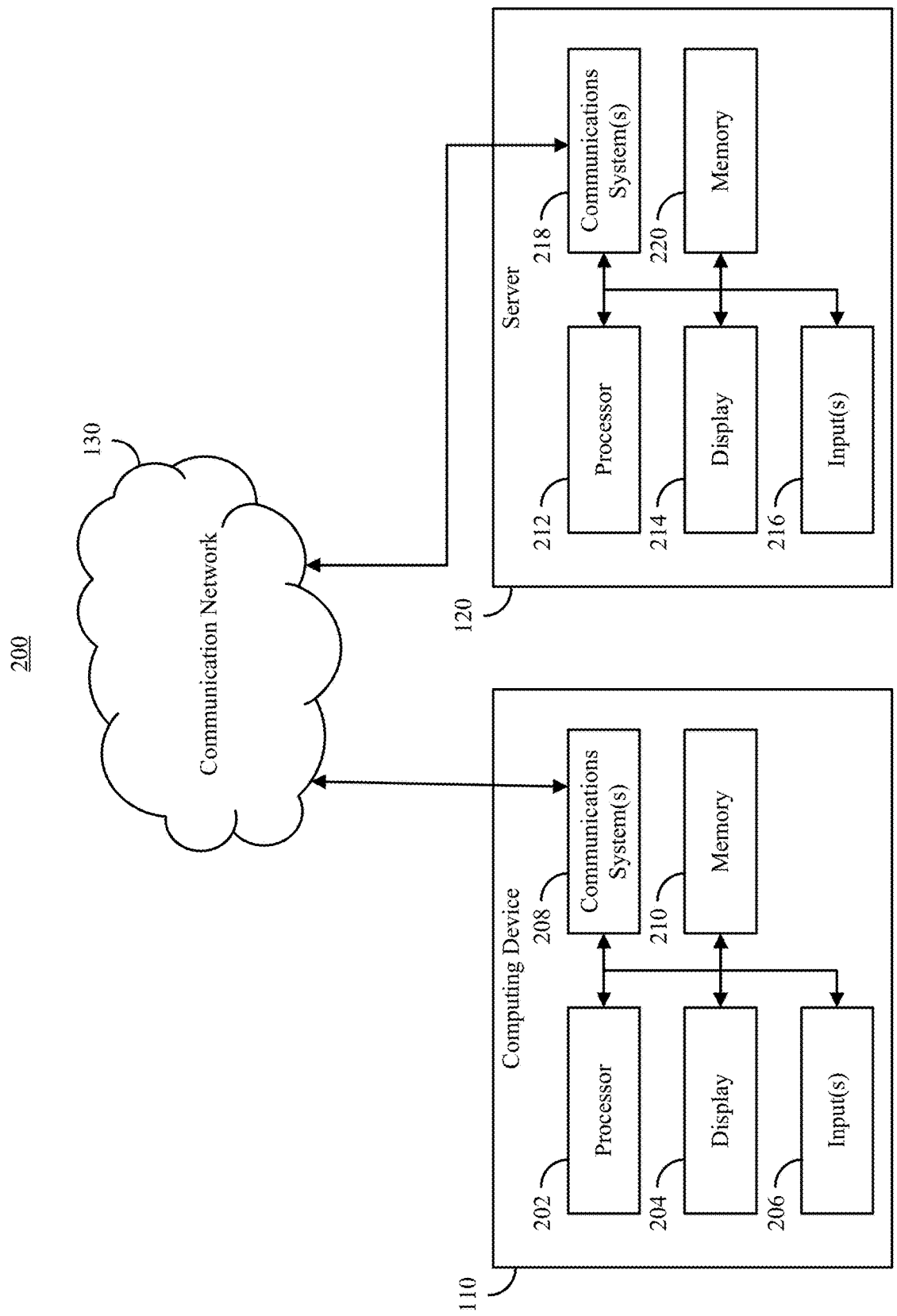
FIG. 2 depicts an example of hardware that can be used to implement a computing device and a server, shown in FIG. 1 in accordance with some embodiments of the disclosed subject matter.

FIG. 2 shows an example of hardware 200 that can be used to implement computing device 110 and/or server 120 in accordance with some embodiments of the disclosed subject matter. As shown in FIG. 2, in some embodiments, computing device 110 can include a processor 202, a display 204, one or more inputs 206, one or more communication systems 208, and/or memory 210. In some embodiments, processor 202 can be any suitable hardware processor or combination of processors, such as a central processing unit (CPU), a graphics processing unit (GPU), an application specific integrated circuit (ASIC), a field-programmable gate array (FPGA), etc. In some embodiments, display 204 can include any suitable display device, such as a computer monitor, a touchscreen, a television, etc. In some embodiments, inputs 206 can include any suitable input devices and/or sensors that can be used to receive user input, such as a keyboard, a mouse, a touchscreen, a microphone, a camera, etc.

In some embodiments, communications systems 208 can include any suitable hardware, firmware, and/or software for communicating information over communication network 130 and/or any other suitable communication networks. For example, communications systems 208 can include one or more transceivers, one or more communication chips and/or chip sets, etc. In a more particular example, communications systems 208 can include hardware, firmware and/or software that can be used to establish a Wi-Fi connection, a Bluetooth connection, a cellular connection, an Ethernet connection, etc.

In some embodiments, memory 210 can include any suitable storage device or devices that can be used to store instructions, values, etc., that can be used, for example, by processor 202 to generate a non-fungible token, to present a digital asset using display 204, to communicate with server 120 via communications system(s) 208, etc. Memory 210 can include any suitable volatile memory, non-volatile memory, storage, or any suitable combination thereof. For example, memory 210 can include random access memory (RAM), read-only memory (ROM), electronically-erasable programmable read-only memory (EEPROM), one or more flash drives, one or more hard disks, one or more solid state drives, one or more optical drives, etc. In some embodiments, memory 210 can have encoded thereon a computer program for controlling operation of computing device 110. For example, in such embodiments, processor 202 can execute at least a portion of the computer program to receive inputs from a graphical user interface for customizing a golf club, store in memory an image of a digital asset based on the user's customizations, generate a non-fungible token based on the digital asset, and mint the non-fungible token to a blockchain network made up of computing devices 110 and/or servers 120. As another example, processor 202 can execute at least a portion of the computer program to implement the system 100 for generating an NFT corresponding to a paired digital and physical golf club. As yet another example, processor 202 can execute at least a portion of process 500, 700, and 800 described below in connection with FIGS. 5, 7 and 8.

In some embodiments, server 120 can include a processor 212, a display 214, one or more inputs 216, one or more communications systems 218, and/or memory 220. In some embodiments, processor 212 can be any suitable hardware processor or combination of processors, such as a CPU, a GPU, an ASIC, an FPGA, etc. In some embodiments, the display 214 can include any suitable display device, such as a computer monitor, a touchscreen, a television, etc. In some embodiments, inputs 216 can include any suitable input devices and/or sensors that can be used to receive user input, such as a keyboard, a mouse, a touchscreen, a microphone, a camera, etc.

In some embodiments, communications systems 218 can include any suitable hardware, firmware, and/or software for communicating information over communication network 130 and/or any other suitable communication networks. For example, communications systems 218 can include one or more transceivers, one or more communication chips and/or chip sets, etc. In a more particular example, communications systems 218 can include hardware, firmware and/or software that can be used to establish a Wi-Fi connection, a Bluetooth connection, a cellular connection, an Ethernet connection, etc.

In some embodiments, memory 220 can include any suitable storage device or devices that can be used to store instructions, values, etc., that can be used, for example, by processor 212 to present content using display 214, to communicate with one or more computing devices 110, etc. Memory 220 can include any suitable volatile memory, non-volatile memory, storage, or any suitable combination thereof. For example, memory 220 can include RAM, ROM, EEPROM, one or more flash drives, one or more hard disks, one or more solid state drives, one or more optical drives, etc. In some embodiments, memory 220 can have encoded thereon a server program for controlling operation of server 120. For example, in such embodiments, processor 212 can execute at least a portion of the server program to receive inputs from a GUI for customizing a golf club or set, store in memory (e.g., memory 220) an image of a digital asset based on the user's customization, generate an NFT based on the digital asset, and/or mint the NFT to a blockchain network made up of computing devices 110 and/or servers 120. As another example, processor 212 can execute at least a portion of the server program to implement the system 100 for generating an NFT corresponding to a paired digital and physical golf club. As yet another example, processor 202 can execute at least a portion of process 500, 700, and 800 described below in connection with FIGS. 5, 7, and 8

Figure 3:
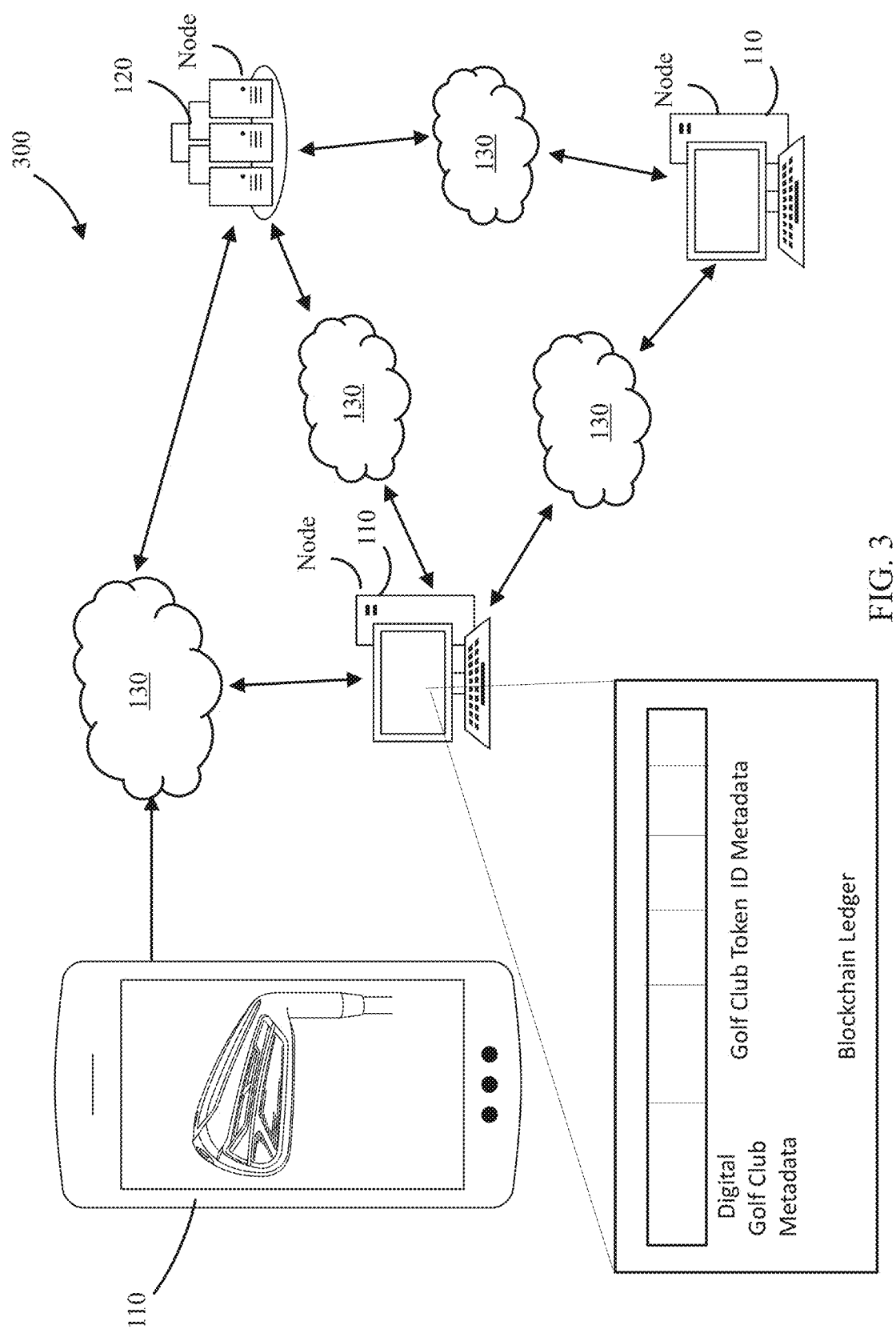
FIG. 3 depicts a schematic representation of an example blockchain network according to some embodiments of the present disclosure.

FIG. 3 illustrates an example blockchain network 300 according to some embodiments of the present disclosure.

The blockchain network 300 may include one or more blockchain nodes. The blockchain nodes may each be a computing device 110 (e.g., similar to computing device 110 of FIGS. 1 and 2), or a server 120 (e.g., similar to server 120 of FIGS. 1 and 2) that are in communication with one another (e.g., via a communication network similar to the communication network 130 of FIGS. 1 and 2). The golf club NFT may be stored in a blockchain ledger stored on one or more of the blockchain nodes (e.g., "minted" into the blockchain ledger stored in the blockchain network, and thereby stored in memory of one or more of the blockchain nodes). For example, metadata of the golf club NFT may be stored in memory on a local computing device (e.g., computing device 110), and may be copied into the memory of one or more blockchain nodes (e.g., servers, such as server 120, and/or computing devices that may be similar to computing device 110). The one or more blockchain nodes may be responsible for storing data that is contained in the blockchain ledger. Each of the one or more blockchain nodes may store (e.g., in memory, such as, memory 210 or 220) a copy of the blockchain ledger (e.g., a deed tracking various transactions of, and modifications to, a digital asset, such as a digital golf club).

The one or more blockchain nodes may each be a computing device located at one or more geographic locations, thereby creating a decentralized computing architecture. The blockchain network may be a public network (e.g., available to any user), or a private network (e.g., available to a specific set of users). For example, an organization may develop an application for storing NFTs corresponding to both digital and physical products (e.g., golf clubs, golf club sets, golf bags, articles of footwear, or articles of apparel). The application may be a mobile application, or desktop application, or web-based applet, comprising computer-readable instructions stored in, for example, memory 210 or 220, and configured to be executed by, for example, processor 202 or 212 (see FIG. 2). Any user who downloads the application onto a computing device, may then add their computing device to the blockchain network as a blockchain node. In some embodiments, the blockchain network may be private and, thus, limited to users who download the organization's application and obtain authorization to participate. If the application is available to the public, then the blockchain network may be a public network. However, if the organization restricts who has access to the application, or restricts authorization for select individuals who download the application from becoming a blockchain node, then the blockchain network may be a private network, such as e.g., a permissioned network. Generally speaking, the permissioned network is a distributed ledger that is not publicly accessible and can only be accessed by users with certain permissions, and the users can only perform specific actions granted to them by the central owner or the ledger administrators and are required to identify themselves through certificates or other digital means. In some embodiments, the blockchain network may be a known blockchain network (e.g., Bitcoin, Ethereum, or the like), and the permissioned network may be a sub-set or service associated with a known blockchain network.

The blockchain network may be an open, yet encrypted peer-to-peer network in which asset transaction records are linked via cryptographic hash functions in a distributed, immutable ledger of interconnected blocks. Each blockchain node may contain a ledger of blocks that includes one or more digital asset transactions accompanied by corroboration information representing a validity of each transaction as assessed by peer-validation devices (e.g., the other blockchain nodes in the blockchain network). Encrypted, decentralized computing architectures allow for authentication of transacted assets while preventing duplication of a cryptography-protected ("cryptographic") digital asset registered to the blockchain network. Decentralized asset management may work by encrypting a proprietary asset file, breaking the encrypted code into segments, and sending the segments to numerous different blockchain nodes (e.g., the blockchain nodes of FIG. 3) in the blockchain network. A validated owner may be provided with a private key that indicates where in the network the digital asset is located and how to reassemble or "decrypt" the file. For use as a distributed ledger, an individual blockchain may be managed by a host administrator and distributed to multiple peers collectively adhering to a protocol for inter-node communication and transaction validation.

The golf club NFT may be a digital asset stored in the blockchain network. The golf club NFT may include metadata corresponding to a digital golf club (e.g., 2D representation, or a 3D representation of a virtual golf club), and a golf club token ID. The golf club token ID may be a 32-bit, 64-bit, or 128-bit alphanumeric code that is sectioned into individual segments. For example, the alphanumeric code may be sectioned into 2 segments, 4 segments, 8 segments, 16 segments, or 32 segments. One or more of the code segments may correspond to common attributes between the digital golf club and a physical golf club corresponding to the digital golf club. Additionally, or alternatively, the one or more code segments may correspond to attributes of solely the physical golf club, or solely the digital golf club. For instance, the golf club NFT and token can be built in accordance with contemporary and relevant standards, such as, e.g., an Ethereum Request for Comments (ERC) 721 (Non-Fungible Token Standard) or ERC1155 (Multi Token Standard), among other relevant standards and as appropriate for the particular blockchain network and applications used therewith.

For example, the code segments may include metadata corresponding to one or more attributes from the group of: a golf club image, golf club handing (i.e., left hand or right hand orientation), golf club size, golf club type, golf club fit, golf club color, golf club model, location of manufacture, date of manufacture, or date of purchase. Additional combinations of the above-listed attributes should be recognized by those of ordinary skill in the art.

The attribute golf club type may comprise metadata corresponding to a putter, iron, fairway or wood, hybrid, or driver. The attribute golf club handing may comprise metadata corresponding to left hand or right hand. The golf club size may comprise metadata corresponding to shaft length in U.S. Men's sizes. It should be understood that metadata may correspond to similar sizes in Women's sizes, children's sizes, unisex sizes, and shaft length measurements of foreign countries. The attribute golf club model may comprise metadata corresponding to a subset or species of the type of golf club type. For example, the golf club model may comprise metadata corresponding to a 1-wood, 3-wood, 5-wood, 7-wood, and so on. The golf club model may comprise metadata corresponding to a 1-iron, 2-iron, 3-iron, 4-iron, 5-iron, 6-iron, 7-iron, 8-iron, 9-iron, pitching wedge, approach wedge, sand wedge, or a lob wedge. The golf club color segment may comprise metadata corresponding to Black, Gray, Brown, Blue, Green, Orange, Tan, Yellow, Red, White, Multi-Colored, or Pink. The golf club fit segment may comprise metadata corresponding to various fit and performance measurements.

In some embodiments, metadata of a golf club can be stored on computing nodes that are generally similar to servers 120, but are not part of the blockchain network. For example, in some embodiments, it can be advantageous to include attributes of a golf club in a NFT that could not be encoded in a 32-bit, 64-bit, or 128-bit code. An attribute club, for example could have a custom design that does not correlate to a designated value within the code in the NFT, and would therefore need to be specified outside of the code. A cost of storing this information on a blockchain node can further be prohibitive to including additional information about an attribute golf club, which can in turn increase a cost of the NFT and impose practical limitations on the amount and structure of the data stored in an NFT. Further, third-party applications may require attributes of an NFT to be differently formatted to read and interpret the attributes of an NFT. An NFT marketplace, for example, can expect information of an NFT to be in JSON format or XML, format in order to accurately represent information about the NFT, in accordance with the ERC 721 and/or the ERC 1155 standards. Thus, in some embodiments, metadata of the attribute golf club can be stored on nodes that are not themselves blockchain nodes. This metadata can, for example, be in JSON format and can provide an unlimited number of attributes of a golf club in custom fields of the JSON object. The JSON payload can be accessible at a web address (e.g., a URL endpoint), and the endpoint can be provided in the body of the NFT as a URI, according to the ERC 721 and ERC 1155 standards. Thus, third-party applications (e.g., third-party integration 420 in FIG. 4), such as video games or online NFT marketplaces could read the URI from the body of the NFT, and access the web address specified in the URI to obtain information about the attribute golf club. The computing nodes used to store metadata of an attribute golf club could be hosted by the provider of the NFT, and can be updated by the provider, or could be hosted on a third-party NFT hosting service in the cloud, which could, for example, ensure immutability of the NFT.

One should appreciate that the disclosed systems and techniques provide many advantageous technical effects including construction and storage of a digital asset blockchain representing user-to-user transactions of virtual collectables. Further, the blockchain technology enables the creation of unique, yet fully transferrable digital assets that maintain value by way of the general inability to make lossless copies (unlike traditional, unsecured digital files).

Figure 4:
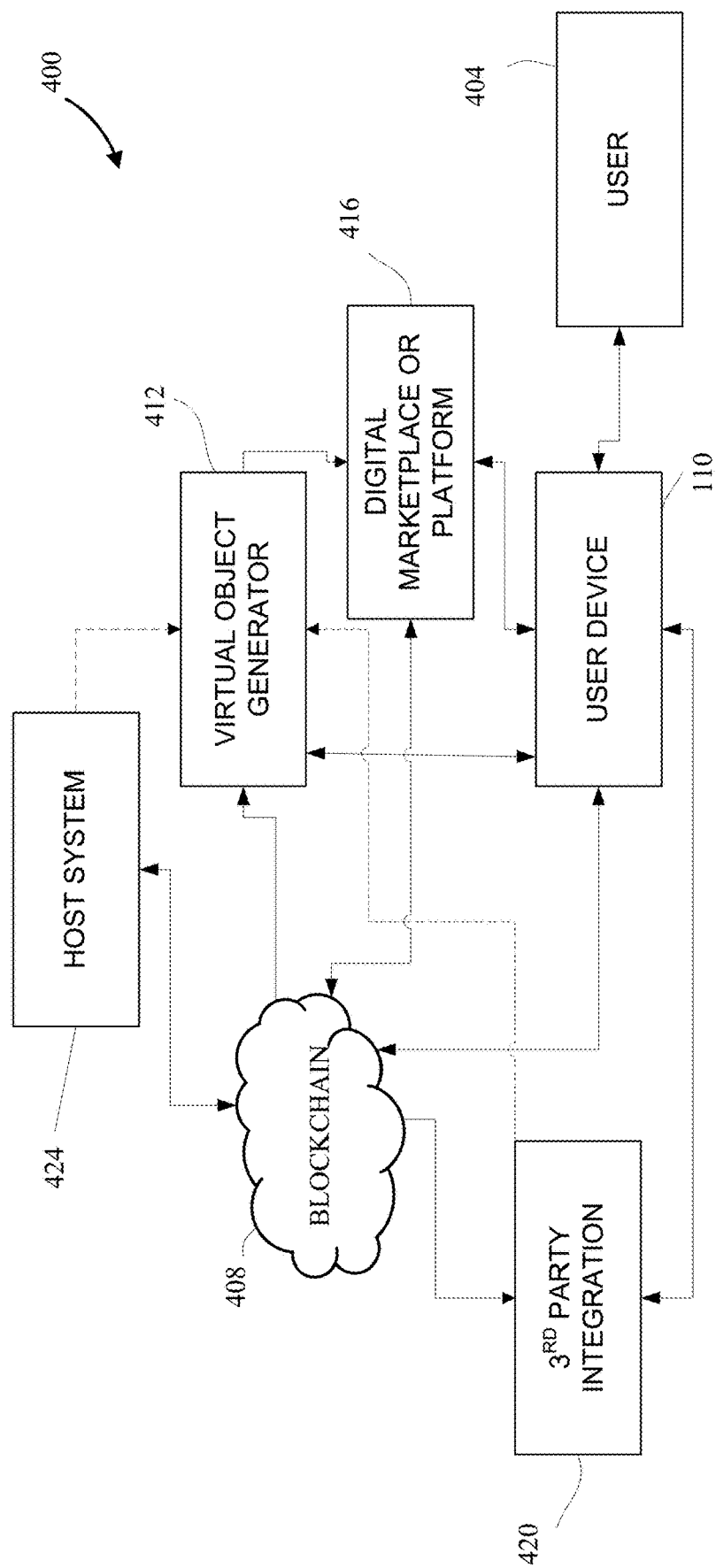
FIG. 4 depicts another schematic representation of an example blockchain network according to some embodiments of the present disclosure.

FIG. 4 provides a schematic representation of a functional structure of a decentralized computing system or blockchain network 400, similar to the blockchain network 300 of FIG. 3. As generally illustrated, a user 404 may operatively interface with the user device 110 that may include one or more of a smartphone, a tablet computer, a smart watch, a laptop computer, a desktop computer, a standalone video game console, smart footwear/apparel, or other similar internet enabled devices, e.g., a television, an exercise machine or device, or a vehicle, among other examples. The user device 110 may be operatively configured to communicate with one or more of an immutable public database (e.g., a blockchain service/network 408—referred to as "blockchain network 408"), a virtual object generator 412, an online digital marketplace or platform 416, and/or a third (3r d) party integration service 420.

In general, the blockchain network 408 may include at least one non-fungible token registered thereon that includes information representative of a digital asset. The user 404, via the user device 110, may be in possession of or may have a wallet that includes a private cryptographic key that permits the user device to read the encrypted data associated with the token. This key may further enable the user 404 to freely transfer ownership of the token.

A virtual object generator 412 may be provided to create a digital object on the basis of the information associated with the token. The virtual object generator 412 may employ a plurality of style and artistic rules such that the resultant digital objects are unique, yet recognizable according to predefined silhouettes, styles, articles, or characters. In some embodiments, or on the basis of auxiliary factors, such as the age of the asset, user activity (tracked via the user device), or use via third party platform. The virtual object generator 412 and/or blockchain network 408 may further be in communication with a hosted digital marketplace or online platform 416, forum, social platform, or the like. The digital marketplace 416 may represent a plurality of virtual objects in a manner that permits the organized trade and/or sale/purchase of the virtual objects between parties. Upon closing of the sale or transfer, the digital marketplace 416 may update the blockchain network 408 with the new ownership information and facilitate the transfer of new or existing keys to the new asset holder. In some embodiments, the marketplace 416 may further enable various social engagement functions, such as voting or commenting on the represented virtual objects. Likewise, in some instances the marketplace 416 may be configured to assess and score the scarcity of a particular virtual object based on the sum total of the object's expressed features or characteristics, as well as consideration of any of the auxiliary factors. Such a scarcity score may then enable the marketplace (and/or users who participate within the marketplace) to better assess the value of the object.

Further, the system 400 may further include a 3rd party integration service 420 that may enable the use of the virtual object in different contexts or manners. The 3rd party integration service 420 may operate as an API on an app provided on the user's device, or as a dedicated cloud based service. In some embodiments, the 3rd party integration service 420 may make the virtual object (e.g., as expressed by the virtual object generator 412), and/or the information available for external use. Examples of such a use may include skins on 3rd party video game characters, objects capable of being used by 3rd party video game characters, digital artwork displays, physical 2D print generation, manufacturing production, such as, e.g., 3D print generation, and the like. In one embodiment, the information and/or scarcity score may be made available and may alter the characteristics or abilities of a user's video game character in a video game played on the user's device 110.

A corporate host system 424 may be in communication with the blockchain network 408 for the purpose of provisioning and/or initially creating new digital assets. Additionally, the host system 424 may provide one or more rules to the virtual object generator 412 to constrain the manner and style in which genomic information from the blockchain network 408 is expressed in a visual/artistic form.

Figure 5:
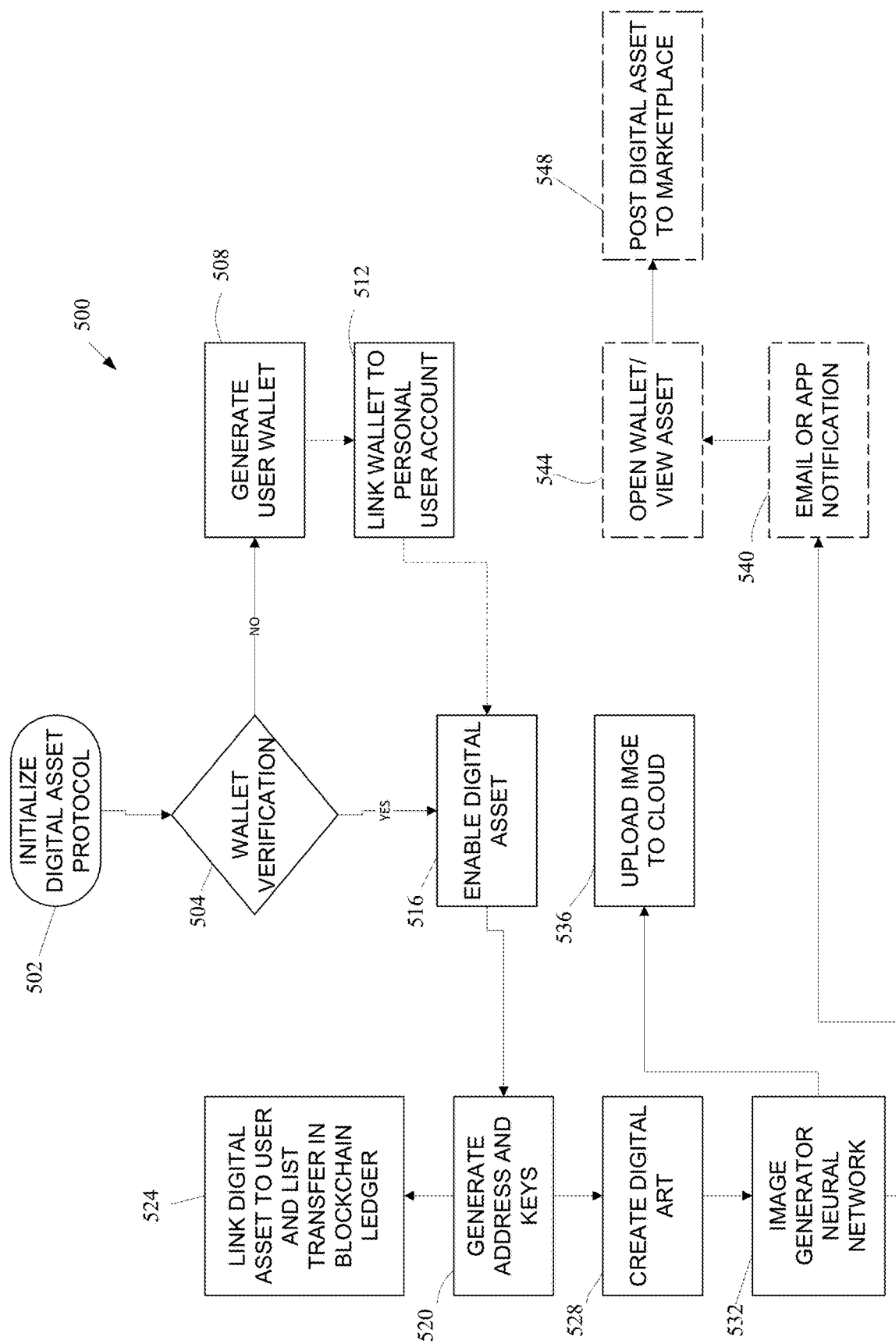
FIG. 5 depicts a flowchart for an example method of generating a digital asset protected by a non-fungible token according to some embodiments of the present disclosure.

With reference to FIG. 5, a method of generating a digital asset protected by NFTs on a blockchain ledger is generally described in accordance with aspects of the present disclosure. Some or all of the operations in FIG. 5 and described in further detail below may be representative of an algorithm that corresponds to processor-executable instructions that may be stored, for example, in main or auxiliary remote memory, and executed, for example, by a resident or remote controller, central processing unit (CPU), control logic circuit, or other module or device or network of devices, to perform any or all of the above or below described functions associated with the disclosed concepts. It should be recognized that the order of execution of the illustrated operation block may be changed, additional blocks may be added, and some of the blocks described may be modified, combined, or eliminated.

The method 500 of FIG. 5 starts at terminal block 502 with processor-executable instructions for a programmable controller or control module or similarly suitable processor to call up an initialization procedure for a protocol to generate a cryptographic digital asset, such as a computer-generated digital golf club and encrypted token key, for a consumer product. This routine may be called-up and executed in real-time, continuously, systematically, sporadically, and/or at regular intervals. As a representative implementation of the methodology set forth in FIG. 5, the initialization procedure at block 502 may automatically commence each time an authentic golf club is manufactured, at various stages of the supply chain and manufacturing process, each time a user 404 purchases a real-world golf club, or each time the user 404 unlocks an access key. Alternatively, the initialization procedure may be manually activated by an employee at a POS terminal or by the manufacturer.

Using a user device 110, such as, e.g., a portable electronic device, including a smartphone, or other electronic device, the user 404 may launch a dedicated mobile software application (app) or web-based applet that collaborates with a server-class (backend or middleware) computer (e.g., a remote host system) to communicate with the various peer devices on the decentralized computing system 400. During a communication session with, e.g., the host system 424, the user 404 may purchase a golf club using a corresponding feature provisioned by the app. The user 404 enters the personal information and a method of payment to complete the transaction. Upon completion of a validated payment, the host system 424 receives, e.g., from an online store transaction module or an approved third-party electronic payment system, a transaction confirmation to indicate a validated transfer of the golf club to the user 404 has been completed. As indicated above, validated transfer of the golf club may be effectuated through any available means, including at a brick-and-mortar store, through an online auction website, an aftermarket consumer-to-consumer trade/sale, etc.

Next, the method 500 proceeds to decision block 504 to determine if the user 404 has procured a cryptocurrency wallet or other similarly suitable digital blockchain account that is operable, for example, to upload and maintain location and retrieval information for digital assets that are encrypted and stored in a decentralized manner. A cryptocurrency wallet typically stores public and private key pairs, but does not store the cryptocurrency itself; the cryptocurrency is decentrally stored and maintained in a publicly available blockchain ledger. With the stored keys, the owner may digitally sign a transaction and write it to the blockchain ledger. A platform-dictated smart contract associated with the wallet may facilitate transfer of stored assets and create a verifiable audit trail of the same. If the user 404 has not already acquired a digital blockchain wallet, the method 500 continues to predefined process block 508 to set up a wallet. By way of non-limiting example, user 404 may be prompted to visit or may be automatically routed to any of an assortment of publicly available websites that offer a hardware wallet for cold storage of cryptocurrency such as an ERC20-compatible Ethereum wallet provided by MyEtherWallet, or Metamask, among other viable sources or providers.

Once the system confirms that the user 404 has a suitable digital blockchain wallet, the method 500 may automatically link, or prompt the user 404 to link, the digital blockchain wallet to a personal user account, as portrayed at process block 512 of FIG. 5. This may require the remote host system 424 retrieve a unique owner ID code associated with the purchasing party (e.g., user 404) from an encrypted relational database (e.g., provisioned through cloud computing system 130). At this time, a unique physical golf club ID code associated with the purchased golf club 10 may be linked to the user's personal account.

Upon determining that the user 404 has acquired a digital blockchain wallet, or after linking the user's blockchain wallet to their personal user account, the method 500 continues to input/output block 516 to enable a cryptographic digital asset associated with the golf club transacted at process block 516. As indicated above, after purchasing the golf club, the universally recognized UPID product code may be used to retrieve a collectable golf club NFT, which is generally composed of a collectable digital golf club and a unique NFT that is identified by an encrypted token key. In some embodiments, the UPID may be used to trigger a function of the golf club NFT, such as compensation for a third party, e.g., a fitter, associated with or identified by the metadata of the golf club NFT. A third-party or a retailer at a POS terminal or the user 404 employing their user device 110 may scan the UPID or UPC on the golf club or a box storing therein the golf club. Enabling a cryptographic digital asset may be automatic, random, systematic, prize based, or any logically appropriate manner.

After receiving confirmation that a cryptographic digital asset has been authorized at input/output block 516, the method 500 generates a cryptographic digital asset for the transacted golf club. This may comprise generating a unique, encrypted asset code with a contract address (i.e., the address where the smart contract is deployed on the blockchain network), a token, and a public and private key pair, as denoted at predefined process block 520. Host system 424 may transmit the token, with the public key and the owner ID, to a distributed blockchain ledger to record and peer-validate transfer of the cryptographic digital asset to the user 404 on a transaction block. The method 500 continues to process block 524 to link the cryptographic digital asset with the unique owner ID code. This control logic may comprise executable instructions for assigning the encrypted asset code to the user 404 and storing the public and private keys in the user's digital blockchain wallet.

With continuing reference to FIG. 5, the method 500 proceeds to process block 528 to produce the virtual representation or "digital art" of the cryptographic digital asset. The virtual representation may include a computer-generated avatar of the golf club or a limited-edition artist rendition of the golf club. It is also envisioned that one or more attributes of the virtual representation of the cryptographic digital asset may be created, in whole or in part, via the user 404. A machine learning function may be executed at predefined process block 532 in order to generate image features through a neural network. Upon completion of the digital art, the image may be uploaded to cloud computing system 130 at block 536. In addition, optional process block 540 may issue a digital notification, such as an email or push notification, to the user's smartphone 110, or other electronic device, with all related information for accessing, transferring and intermingling the cryptographic digital asset. The remote host system 424 may operate as a web server hosting a web-based graphical user interface (GUI) that is operable to translate the data stored in the encryption keys into a visual image that is displayed to the user 404 at optional process block 544. Digital asset manipulation and use may also be effectuated through the user's digital blockchain wallet. This may comprise posting the cryptographic digital asset to an online crypto-collectable marketplace or platform, as provided in optional process block 548.

Generally, by incorporating metadata into the non-fungible token (NFT) that corresponds to attributes of a physical golf club, the digital golf club corresponding to the NFT will be linked to the physical golf club. For example, the digital golf club may appear to be the same size, color, and material on a display screen (e.g., display screen of computing device 110) as a corresponding physical golf club. In some embodiments, the metadata includes reference to a UPID that corresponds to the physical code, or a version thereof, associated with the physical golf club, thereby linking the golf club NFT to the physical golf club in a one-to-one fashion. In some embodiments, the golf club NFT may be provided as a collection or family of golf club NFTs having, e.g., variations or permutations in attributes or appearance or underlying metadata, but with each golf club NFT in the collection being linked to the same physical golf club by way of reference to the UPID in the metadata. In this way, one common physical golf club can be linked across multiple golf club NFTs that are generated as a collection of golf club NFTs each containing unique digital golf club. The golf club NFTs can, therefore, be a collection of two (2) or more, such as, e.g., a collection of 3, 4, 5, 6, 7, 8, 9, 10, 11, 12, or more, a collection of 20 or more, a collection of 50 or more, a collection of 100 or more, a collection of 250 or more, or a collection of 500 or more.

Referring to FIG. 4, a schematic representation of an exemplary golf club fitting system 600 is depicted for a user 604. The fitting system 600 includes a computing device 608, such as the computing device 110, that is in communication with at least one screen 612 and at least one sensor 616. In the illustrated embodiment, the user 604 is holding a tangible golf club 620 at address, before swinging the golf club 620 to hit a ball 624. The screen 612 displays a virtual golf course or a hole, which is provided to help the user 604 visualize the desired swing appropriate for the golf club 620 in hand. Further, the at least one sensor 616 is provided for detecting information about the user 604, the club 620, and the ball 624. It will be appreciated that several sensors of varying kinds and types can be employed in the fitting system 600. For example, the at least one sensor 616 may be a camera, a video motion sensor, a light detection and ranging (LIDAR) sensor, an ultrasonic sensor, an area reflective sensor, a passive infrared sensor, or the like. Further, the at least one sensor 616 may be attached to or embedded within the ball 624 or the club 620 to detect the location, acceleration, velocity, force, or some combination thereof. For example, the at least one sensor 616 may be a global positioning system (GPS) sensor, a load cell, a strain gauge, an accelerometer, a force sensing resistor (FSR), a receiver or transmitter or transceiver, or the like. Various configurations of the at least one sensor 616 are contemplated, such as providing one sensor 616 in the club 620, another sensor 616 in the ball 624, and another sensor 616 mounted adjacent the screen 612 (see FIG. 6), among other configurations.

As part of typical golf club fitting processes, the at least one sensor 616 captures data associated with the user 604 swinging the golf club 620 to hit the ball 624 into the screen 612 and the captured data are then communicated to the computing device 608. A software application or platform runs on the computing device 608 and receives the data collected by the at least one sensor 616. The fitting system 600 can be operated by a fitter (not shown) who works within the software application via the computing device 608 to review and analyze the data gathered by the at least one sensor 616, as well as information collected in various other manners, such as through written or verbal communication with the user 604, monitoring the user's 604 movement and performance when swinging the golf club 620, among others. In some embodiments, the fitter (not shown) is an individual, or the fitter may be an entity. Accordingly, the fitting system 600 may be operated by the fitter, whether through manual operation and input or through an automated version in which the user 604 directly interacts with the computing device 608 without intervention of involvement of the fitter.

With reference to FIG. 4, the computing device 608 of the fitting system 600 is also in communication with a blockchain network or blockchain 628. The blockchain 628 may be public or private, and may be a known blockchain (e.g., Ethereum) or a proprietary or novel blockchain. Further, a user device 632, e.g., the user device 110, may be in communication with the blockchain 628, such that a user's digital wallet 640, is linked to the blockchain 628. That is, the public key associated with the user's digital wallet 640 may be linked to the blockchain 628. In some embodiments, the user device 632 is a smartphone. In the illustrated embodiment, the display screen of the user device 632 can display a digital object 636 produced in connection with the fitting system 600, as will be described below. Additionally, the fitter may also have a digital wallet, similar to the user's digital wallet 640, which may have a public key and be linked to the blockchain 628 via the computing device 608 or through another personal device.

As the platform on the computing device 608 collects, processes, sorts, and organizes the data captured by the fitting system 600, Fit Data FD is produced and stored in the memory of the computing device 608 or on a server connected to the computing device. The Fit Data FD may include any of the data gathered by the fitting system 600, data that is entered into the software application by the fitter, metrics or statistics that are calculated by operation of the software application of the computing device 608, or the like. In some instances, the Fit Data FD includes information associated with the user's 604 particular session with the fit system 600, including a date, a time, a duration, information about the fitter, information about the user, information about the golf club or clubs used, information about the ball, captured data from the one or more sensors 616, information that is manually entered or provided to the fitting system 600, and the like. In some embodiments, information about the fitter's digital wallet, such as the public key, may also be included within the Fit Data FD. Further, the Fit Data FD may include a recommendation or result associated with the user's performance in connection with the fitting system 600. For example, the Fit Data FD may include information relating to a golf club manufacturer or Brand, a golf club type, a golf club model, a lie angle, a loft angle, weight distribution or coordinates for a center of gravity (CG) of the club head, club head material, insert material, insert weight, insert geometry, club head weight, shaft stiffness, shaft length, shaft material, grip type, grip material, grip diameter, or some combination thereof, among other information provided in connection with operation of the fitting system 600. The Fit Data FD can be stored as a file for retrieval and access by the computing device, for transport to other computing devices across a communication network, or the like. The Fit Data FD may be stored as any suitable type of file format, such, as, e.g., an XML, and RDF, a JSON, a Microsoft Excel Spreadsheet, a CSV, a Text Document, including a Microsoft Word document or a PDF, a Plaint Text document, an HTML, or any other proprietary or open source file formats.

The computing device 608 can operate as a node on the blockchain 628 and, accordingly, the computing device 608 of the fitting system 600 can have access to various operations in connection with the blockchain 628. In some embodiments, the computing device 608 can execute a protocol associated with the software application to generate the digital object 636 that can be secured with a non-fungible token NFT and minted to the blockchain 628. Further, the computing device 608 may write or record portions of or all of the Fit Data FD associated with the user 604 and the fitting system 600 to the metadata of the NFT such that the Fit Data FD may be immutably recorded and accessible on the blockchain 628. In this way, the fitting system 600 can be executed to generate a FitNFT, i.e., a digital asset in the form of a non-fungible token NFT having metadata associated with or at least partially including Fit Data FD and an address, e.g., a URL, for locating the FitNFT. In some embodiments, the computing device 608 of the fitting system 600 generates a report based on the Fit Data FD collected in association with a use of the fitting system 600 by the user 604, and the report may be written and recorded in the metadata of the FitNFT.

The FitNFT may be configured with a variety of features and operations by way of the underlying smart contract. In some embodiments, the digital object is generated as a result of or based on the Fit Data FD, such that each digital object corresponds to the Fit Data FD in a unique, one-of-one manner. In some embodiments, the digital object is generated by applying a variety of image processing techniques or algorithms, such as, e.g., color or tone filters, mosaic plots, binary image rendering, 8-bit image rendering, 16-bit image rendering, grayscale rendering, black-and-white rendering, whitewashing, brightness, contrast, sharpness, transparency, or any other image processing technique. In some embodiments, the digital object is generated using, e.g., a permutation generator for producing recursive permutations associated with the Fit Data FD.

Further, the FitNFT can be configured to include a function in the form of executing a royalty amount or commission amount CA. In some embodiments, execution of the commission amount CA is triggered by downstream transactions on the blockchain 628. The commission amount CA can be configured by the Brand. In some embodiments, the commission amount CA may be configured or determined by, at least in part, the user 604, or the fitter, or through mutual agreement between the user 604 and the fitter. It will be appreciated that the execution of the commission amount CA may occur automatically as a function of the smart contract underlying the FitNFT. The commission amount CA can be fixed at the time of minting or creation of the FitNFT, such that the commission amount CA is immutable for the life of the FitNFT. Additionally, functions in the form of intellectual property rights, including copyrights and trademarks rights, among others, associated with the FitNFT may be transferred or retained by the user 604, the fitter, a Brand, or a third-party. For example, the digital object of the FitNFT may include a logo, a tradename, a name, a likeness, an image, a product, or the like, or some combination thereof, and any intellectual property rights associated with, created in, or implicated by the digital object may be transferred or excluded from transfer in downstream transactions. Additionally, the commission amount CA may be determined in connection with the intellectual property rights created and/or transferred or retained via the FitNFT. It will be appreciated that concepts associated with the FitNFT may similarly be associated with other types of cryptographic tokens, including utility tokens or security tokens, or various standards, including Ethereum standards (e.g., ERC-20, ERC-721, ERC-777, ERC-1155).

In some embodiments, execution of the commission amount CA is triggered by a condition linked to the FitNFT. In some embodiments, the condition is a purchase of a particular golf club or set of golf clubs occurring subsequently to the fitting process performed by the fitter, wherein the fitter identified within the metadata of the FitNFT receives the commission amount CA upon the user's purchase of the particular golf club or set of golf clubs. In this way, the fitter is rewarded by, e.g., a particular Brand or Manufacturer of golf clubs, for fitting users for those particular brand of golf clubs. For example, the FitNFT generated as a result of a golf club fitting process (e.g., the process 700 of FIG. 7) used with the golf club fitting system 600 can include Fit Data FD which identifies the fitter, e.g., an entity or individual, with the public key that is linked to the fitter's digital wallet. Accordingly, this link allows the fitter to receive compensation or payment in the form of, e.g., cryptoassets, physical assets, currency, or the like. Additionally, the address, e.g., a URL, provided with the FitNFT may be used to identify and locate the FitNFT on the blockchain 628. Upon purchase of a physical golf club or set of clubs, whether through an online platform or at a physical storefront at a point of sale (POS) system, the user 604 may be provided with an input field in which the address of the FitNFT can be entered to link the FitNFT to the purchased golf club or set of clubs.

In some embodiments, after the user 604 completes the purchase of the golf club or set of clubs, and with verification from the user 604 obtained via a user device 632, the metadata of the FitNFT may be updated with the purchase information. To that end, the online platform or POS terminal may be in communication with the blockchain 628 on which the FitNFT resides, such as through a blockchain node that is operated or administered by the Brand. The Brand may locate the FitNFT on the blockchain 628 by way of the associated address. The Brand may send a notification, e.g., a push notification or an e-mail or a text message or the like, to the user 604 via the user device 632 by which the user 604 may verify that the Brand has permission to update the metadata of the FitNFT or through which the user 604 may update the metadata of the FitNFT. Accordingly, the Brand or the user 604 may update the metadata with information about the purchase, e.g., the purchase price, of the golf club or set of clubs, which may then trigger the commission amount CA to be paid out to the fitter associated with the fitter's digital wallet identified by the metadata of the FitNFT.

In some embodiments, the condition that triggers the commission amount CA is subsequent to the purchase of the golf club or set of clubs. The commission amount CA may not be triggered until receipt of the golf club or set of clubs by the user 604, or until a predetermined time after receipt of the golf club or set of clubs. The golf club or set of clubs may include a physical code, such as, e.g., a UPIC or UPC or QR, which can be scanned by the user device 632, which may be a smartphone with a camera, to trigger the commission amount CA. In some embodiments, the user device 632 may be used to update the metadata of the FitNFT to reflect purchase of the golf club or set of clubs identified by and linked to the physical code. As a result of the update to the metadata of the FitNFT, the commission amount CA may be executed, i.e., paid out to the relevant party, e.g., the fitter. In some embodiments, the commission amount CA may be triggered in other ways. For example, the user 604 may access the online platform 416 and scan the physical code, which then causes a self-executing protocol run on the online platform 416 to trigger the commission amount CA of the FitNFT to be paid out. For example, the online platform 416 may initiate a temporary transfer of the FitNFT to a null address, similar to burning the FitNFT, before initiating a subsequent transfer back to the user 604. As a result of these transfers, the commission amount CA may be triggered and the fitter may be compensated. In some embodiments, the commission amount CA is a percentage of the purchase price associated with the physical code on the golf club or set of clubs. In some examples, the commission amount CA is a predetermined amount set by the Brand before or at the time of generating and minting the FitNFT. However, the commission amount CA may be any amount or percentage of any value, or a range of amounts or percentages of any value.

Figure 6:
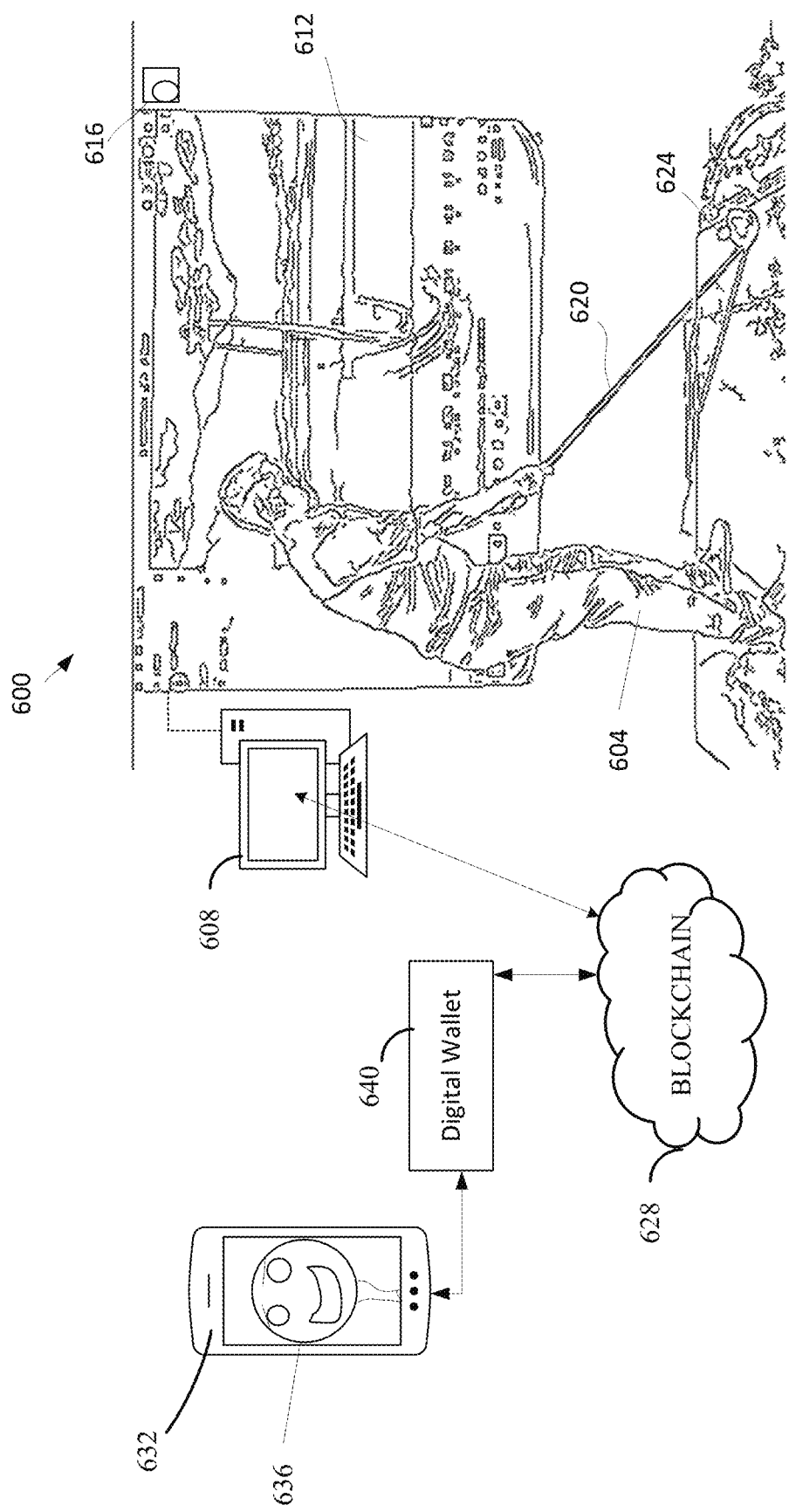
FIG. 6 depicts a schematic representation of an embodiment of a golf club fitting system.
Figure 7:
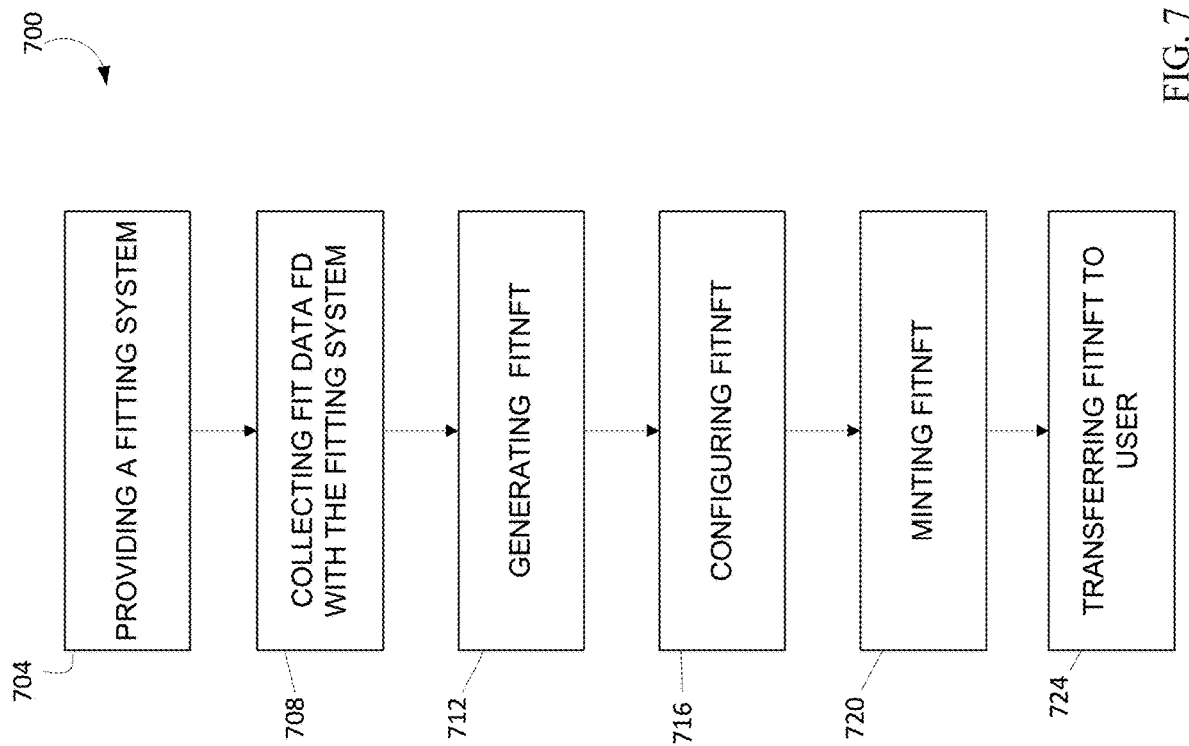
FIG. 7 depicts a flowchart for an example golf club fitting process.

FIG. 7 depicts a flowchart of a golf club fitting process 700 in connection with the fitting system 600 of FIG. 6. In Step 704, the fitting system 600 is provided, such that the fitter operates the fitting system 600 for the user 604. Often, this includes the user 604 attending an in-person location or storefront where the fitting system 600 is operated by the fitter, although in some instances the fitting system 600 is mobile and can be transported to the user 604. Additionally, the fitting system 600 could be operated automatically with input from the user 604, in which case the user 604 operates the fitting system 600 independently of an individual fitter.

In Step 708, Fit Data FD is collected by the fitting system 600 and stored with the computing device 608, as described previously. Accordingly, the fitting system 600 executes protocol within the software platform to process the Fit Data FD received by the at least one sensor 616, as well as the data received from other sources describe above. As a result of such processing, the fitting system 600 may generate a report and/or display the Fit Data FD on the screen 612 for visualization and/or engagement. For example, the user 604 and/or the fitter may view the Fit Data FD as it is collected and processed by the fitting system 600, and further simulations or testing or exercises may be performed to generate Fit Data FD. Additionally, the Fit Data FD may be edited or revised or modified by manual entry of the user 604 and/or the fitter.

Step 712 comprises generating the FitNFT based on and/or in association with the Fit Data FD, in accordance with at least a portion of the process 500 described in connection with FIG. 5. In some embodiments, the Brand generates the FitNFT to be used with the fitting system 600. For example, the Brand may generate the FitNFT upon receipt of a communication request from the fitting system 600 via the communication network 130. It is contemplated that the FitNFT may be created as a new digital asset as part of the process 700. It is further contemplated that the FitNFT may be selected or unlocked by the fitting system 600 from a reserve of pre-generated, generic FitNFTs. The FitNFT may also be visualized or displayed on the screen 612.

Step 716 comprises configuring the FitNFT in accordance with one or more parameters and/or features. In some embodiments, the Brand performs the Step 716 of configuring of the FitNFT to set or determine the commission amount CA. In some embodiments, the commission amount CA is set as a range by the Brand, and the particular commission amount CA is determined by various inputs or conditions associated with the fitting process in connection with the fitting system 600. For example, the commission amount CA may be set or selected by the user 604, the fitter, or automatically determined by self-executing protocol of the fitting system 600. In some embodiments, the user 604 or the fitter is presented with a menu of pre-determined commission amounts CA from which one can be selected. In some embodiments, the user 604 or the fitter is presented with a menu for selection of a variety of configurations for the FitNFT, including, e.g., pre-determined digital objects, pre-determined methods of generating digital objects, transfer or retention of intellectual property rights, commission amount CA details and preferences, limitations on downstream transfer, production of a collection of FitNFTs, exclusion of portions of Fit Data FD, such as personal information, and the like.

Step 720 comprises minting the FitNFT to the blockchain 628 via the computing device 608 of the fitting system 600. In some embodiments, the Brand mints the FitNFT to the blockchain 628 upon receiving a communication request from the fitting system 600, which may be initiated by the fitter or automatically initiated by operation of a self-executing program of the fitting system 600. Step 724 comprises transferring the FitNFT to the user 604, such that the digital portfolio or wallet 640 is linked to the FitNFT. In some embodiments, before transfer of the FitNFT to the user 604, the user 604 must be registered with the online platform 416 and the user's digital wallet 640 must be linked to the online platform 416, as described in Steps 508 and 512 of the process 500 of FIG. 5. In this way, it is ensured that when the transfer of the FitNFT occurs, as in Step 724, the FitNFT will be linked and in communication with the online platform 416 to allow the Fit Data FD and/or metadata of the FitNFT to be communicated to the online platform 416, such as in connection with the purchase of a golf club or a set of clubs. Accordingly, purchase of the golf club or set of clubs that occurs through the online platform 416 may then trigger one or more functions of the FitNFT, such as executing the commission amount CA. In some embodiments, transfer of the FitNFT to the user 604 may only occur once certain conditions are met, such as, e.g., purchase of a golf club or set of clubs linked to the FitNFT, as described above. In some embodiments, transfer of the FitNFT to the user 604 occurs simultaneously with purchase of the golf club or set of clubs. In some embodiments, the FitNFT is transferred prior to purchase of the golf club or set of clubs, and the metadata of the FitNFT is updated with subsequent purchase information. In some embodiments, the FitNFT is transferred to the user 604 after a predetermined amount of time after purchase of the golf club or set of clubs. In some embodiments, the FitNFT is only available for transfer to the user 604 within a predetermined window of time after conclusion of the fitting process 700 or after minting the FitNFT to the blockchain 628. Further, the FitNFT can be visualized on the user device 632 of the user 604.

It will be appreciated that the user 604 and the fitter may exchange currency, i.e., conduct transactions with payment, at one or more steps throughout the process 700. For example, the fitter may accept payment from the user 604 prior to operation of the fitting system 600. Optionally, the fitter may accept payment from the user 604 during operation of the fitting system 600 to allow for capture of more Fit Data FD, such as data associated with the user of different golf clubs 620, or balls 624, or sensors 616. Further, the fitter may accept payment from the user 604 in connection with the configuration of the FitNFT, or in connection with the transfer of the FitNFT, or in connection with a subsequent purchase of a golf club or set of clubs. It will be further appreciated that the fitter can include or be associated with a manufacturer of golf clubs, e.g., the Brand of the golf clubs. In this way, the user 604 may work directly with the Brand throughout the fitting process 700.

In this way, the fitting system 600 provides a number of benefits to the user 604. For example, the Fit Data FD associated with the user 604 is recorded and stored on the blockchain 628 and authenticated by the FitNFT. Further, in instances where the user 604 selects the commission amount CA during or after the fitting process 700, the fitter may be incentivized to perform a high-quality fitting process for the user 604 to encourage the user 604 to increase the commission amount CA. Further, because the commission amount CA is triggered by the user 604 purchasing a golf club or set of clubs, or from downstream transactions, such as a sale of the FitNFT itself, which may have a transaction value influenced at least partially by the performance or reputation of the user 604, the fitter may be incentivized to offer or provide additional services for the user 604 to grow the user's 604 reputation and improve performance. In addition, the user 604 can benefit from owning the FitNFT associated with the Fit Data FD, which may become valuable in correlation to the user's 604 own reputation. In some instances, the user 604 may be incentivized to return to the fitter, such as, e.g., if the user is an adolescent such that the Fit Data FD will need to be updated as the adolescent grows. It will also be appreciated that the fitter may offer users holding such FitNFTs membership-style benefits, such as sales and discounts on clubs, educational or social events, outings, and the like. Further, third parties including courses, shops or dealers, country clubs, among others, may recognize the FitNFT as a ticket that provides the user 604 access to certain offers, events, drops, memberships, and the like. Additionally, in instances where the Brand sets the commission amount CA, the fitter is incentivized to recommend a golf club or set of clubs offered by the Brand that, upon or after purchase, will trigger the function of paying out the commission amount CA to the fitter. In such instances, the Brand may restrict the commission amount CA to prevent modification by the fitter, the user, a third-party, or any other unauthorized party. In some embodiments, the Brand maintains an off-chain index or database on which the commission amount CA resides, and the metadata of the FitNFT refers to a particular value within the off-chain index or database via a uniform resource locator (URL), such as a link. The Brand may secure the off-chain index or database to prevent visibility and access by unauthorized parties, such as by using an encrypted URL, password protection, two-factor authentication, or the like. In this way, the Brand is able to retain exclusive control of the commission amount CA, which may vary from one fitter to another, or from one user to another, or from one golf club to another. Further, the Brand can protect and conceal particular data, such as the commission amount CA or other data, from access and/or visibility by unauthorized parties. Those skilled in the art will appreciate that restriction of the metadata, including the commission amount CA, from modification by unauthorized parties may occur upon generation or creation of the FitNFT, or by freezing after generation of the FitNFT.

It will be appreciated that process 700 may not require involvement or input from the user 604 or the fitter. For example, the fitting system 600 may be deployed discretely and/or inconspicuously on a physical golf course, at a driving range, in a store, or the like. By way operation of self-executing protocol, the fitting system 600 may collect Fit Data FD via the one or more sensors 616 being concealed from view or hidden in-plain-sight, such as being embedded within the golf club 620, the ball 624, and the screen 612, among other configurations. Further, the fitting system 600 may be programmed to automatically collect and process Fit Data FD over pre-determined time intervals. The fitting system 600 may also be programmed to automatically generate the FitNFT according to based on the Fit Data FD and with pre-determined configurations. Additionally, the automatically-generated FitNFT may be minted to the blockchain 628 and, subsequently, transferred to a user 604, whether or not such user 604 is associated with the Fit Data FD. That is, the FitNFT may be generated based on Fit Data FD collected from a first user and then may be transferred to a completely different second user without involvement of the first user. Alternatively, the FitNFT may be inconspicuously generated and retained by the fitter without transfer to the user 604, such that when the user 604 purchases a golf club or set of clubs in connection with the Fit Data FD, such as by entering the FitID or other means of linking the FitNFT to the purchase, the fitter receives compensation automatically by operation of the commission amount CA of the FitNFT.

Figure 8:
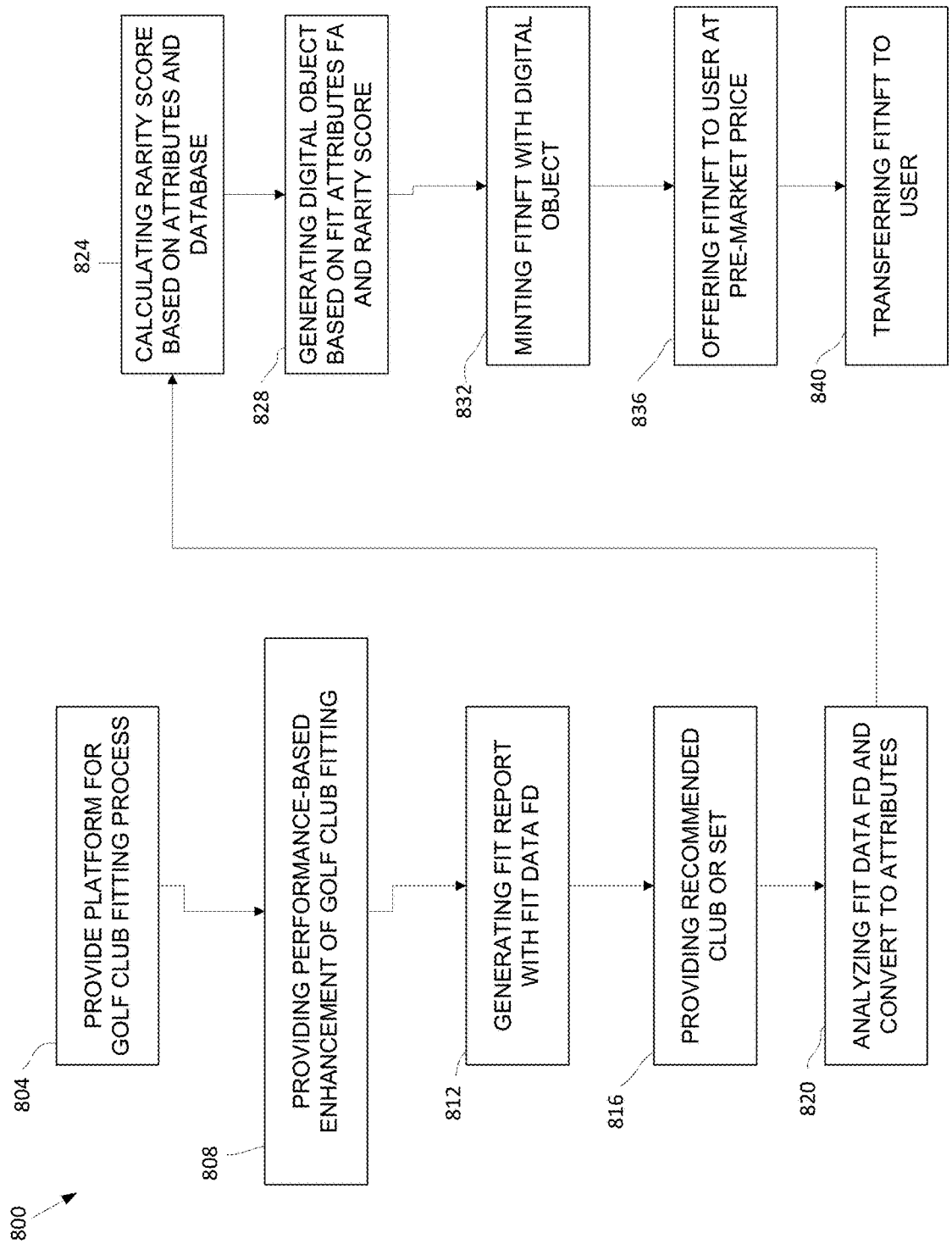
FIG. 8 depicts a flow chart for another example golf club fitting process.

Referring to FIGS. 6 and 8, a flowchart illustrating another embodiment of a golf club fitting process 800 in which the user 604 participates remotely and/or virtually via the user device 632 and in communication with a distributed computing system, e.g., the system 100 of FIG. 1 or the system 300 of FIG. 3. In some embodiments, the user 604 interfaces with and/or accesses a platform, e.g., the platform 416, provided by the fitter and/or the Brand to perform at least part of the fitting process 800. With reference to FIG. 8, Step 804 comprises providing the platform in connection with the golf club fitting process 800. The platform can include a user interface that the user 604 can interact with via the user device 632. Further, the platform may be a registration-based platform, such that the user 604 must register and create login information to access the platform in connection with the fitting process 800. Further, the platform may require the user 604 to link the digital wallet 640 to the platform via the user device 632, as described in connection with the process 500 of FIG. 5. The platform can operate as a guide for the user 604 to progress through or complete the fitting process 800.

In some embodiments, the user device 632 is a smartphone that includes at least one sensor, such as, e.g., a camera, an accelerometer, a location or GPS sensor, and a microphone, among others. In some embodiments, the user device 632 is a laptop, a tablet, or the like. Further, the user interface of the platform is configured to receive golf club fitting information, such as, e.g., height, weight, age, dominant hand, handicap or skill level, experience level, current gear and/or clubs, preferences, goals, issues, and the like. Accordingly, the platform is configured to receive Fit Data FD, similarly to the fitting system 600 of FIG. 6. Additionally, the platform may be configured to receive files, such as, e.g., image files, including JPEG, PNG, PSD, TIFF, or the like, or text files, including Microsoft Word documents or Excel spreadsheets or PDFs, or audio files, including MP3, M4A, FLAC, MP4, WAV, WMA, AAC, or the like. Further, the user interface of the platform may be provided as an application, a web-based applet, or a mobile application, or some combination thereof, among other configurations. Additionally, the platform may be in communication with one or more auxiliary applications that reside on servers 120 or computing devices 110, 608 and that provide additional support for the platform. In some embodiments, the auxiliary applications may include a computer-aided design (CAD) software application, a finite element analysis (FEA) software application, a mathematical computation software application, an image processing software application, or some combination thereof, or the like.

In some embodiments, the platform receives Fit Data FD produced through physical performance of the user 604 captured by the sensors of the user device 632. For example, the user 604 may record a video of several golf club swings, with or without making contact with the ball 624, using the camera of the user device 632. Additionally, the user device 632 can be in communication with the at least one sensor 616 attached to or provided with the golf club 620, the ball 624, a course, a driving range, a tee, or the like. The Fit Data FD is produced and stored in the memory of the user device 632 or on the server 120 connected to the platform. The Fit Data FD may include data that is entered into the platform by the user 604, data captured by the sensors of the user device 632, metrics or statistics that are calculated by operation of the platform or the auxiliary application, or the like. In some instances, the Fit Data FD includes a date, a time, a duration, identification of the user, information about the golf club or clubs used, information about the ball 624, captured data from the one or more sensors of the user device 632 or the at least one sensors 616 external to the user device 632, information that is manually entered or provided to the platform, and the like. The Fit Data FD can be stored as a file for retrieval and access by the computing device 608, for transport to other user devices across a communication network, or the like. The Fit Data FD may be stored as any suitable type of file format, such, as, e.g., an XML, and RDF, a JSON, a Microsoft Excel Spreadsheet, a CSV, a Text Document, including a Microsoft Word document or a PDF, a Plain Text document, an HTML, or any other proprietary or open source file formats.

Step 808 comprises providing performance-based enhancement of at least a portion of the golf club fitting process 800. For example, after the platform receives the Fit Data FD, digital models or representations of the user 604 may be generated, e.g., using the virtual object generator 412 (see FIG. 4) or an auxiliary application, or some combination thereof. Accordingly, simulation parameters may be generated form the Fit Data FD and utilized by the platform and/or the auxiliary application to further analyze the user's performance in connection with the fitting process 800. Accordingly, the simulation parameters can include, e.g., golf club type, swing velocity, club head location, club head angle, shaft flexure, characterization time (CT), ball type, shot distance, shot height, shot location, shot velocity, shot rotation or spin, weather conditions, and the like. The user interface of the platform may provide for interaction with the model or simulation, such that some or any of the simulation parameters may be modified or adjusted. For example, the model or simulation may be operated with various configurations of golf club types, ball types, swing velocities, weather conditions, or combinations thereof, and the like.

Step 812 comprises generating a Fit Report based on the Fit Data FD received by the platform in connection with the fitting process 800. In some embodiments, the user 604 can select various formats or configurations of the Fit Report. For example, the Fit Report may include model or simulation representations, images, audio files, or combinations thereof, and the like. Further, the Fit Report may include some or all of the Fit Data FD received by the platform in connection with the fitting process 800. Step 816 comprises providing a recommendation of golf clubs or golf club sets based on the Fit Data FD received in connection with the fitting process 800. For example, the platform may recommend customized golf club types, models, sizes, and the like in connection with distances that are particular to the user 604. In this way, the user 604 not only receives a recommendation for using the golf clubs, but also of the optimal or preferred scenarios in which to use particular golf club types. Accordingly, to create such customized recommendations with optimized or preferred scenarios, the platform encourages the user 604 to provide more Fit Data FD and to run more simulations and models based on such Fit Data FD.

Step 820 comprises analyzing the Fit Data FD, which is performed by the platform and/or the auxiliary application. Accordingly, the platform runs self-executing protocol to process the Fit Data FD for organization thereof and calculation of metrics associated with the fitting process 800. For example, the Fit Data FD may be used to calculate a user's optimal shaft length, club head weight, shaft stiffness or flexure, and the like. Further, Step 820 includes conversion of at least a portion of the Fit Data FD into Fit Attributes FA. In some embodiments, the Fit Attributes FA are a predetermined set of attributes. In some embodiments, the Fit Attributes FA are selected by the user 604 from a group of attributes. In some embodiments, the Fit Attributes FA are randomly selected and/or generated. Step 824 comprises calculating a Rarity Score RS based on the Fit Attributes FA converted from the Fit Data FD captured in connection with fitting process 800. The Rarity Score RS can also be calculated with input from a sample or universe of corresponding attributes, e.g., a database comprising attributes gathered or cataloged over time from various users, from various iterations of the fitting process 800, or from alternative fitting processes. Further, the Rarity Score RS may be calculated with input from attributes stored in an external database provided by or managed by a third party. For example, an oracle may be used to retrieve data supplemental to or in lieu of the database. Generally speaking, an oracle is an entity that connects a decentralized computing system to an external system and provides inputs to the blockchain, wherein the inputs are specific data or sets of data. In some embodiments, the oracle may be used to retrieve attributes that correspond with one or more of the Fit Attributes FA generated by the platform or the auxiliary application in connection with the fitting process 800. In this way, the Rarity Score RS may be representative of a statistical comparison between the Fit Attributes FA and corresponding attributes gathered from the database. For example, the Fit Attributes may include a golf club type, a swing velocity, a ball type, a shot velocity, a shot distance, and weather conditions, e.g., a wind speed. The platform or auxiliary application may then compare those particular Fit Attributes FA with corresponding attributes representing a sample set stored within the database. The sample set of corresponding attributes may be limited by a time period, a geographic location, or one or more of the Fit Attributes FA. Then, the Fit Attributes FA are statistically compared with the corresponding attributes of the sample set of attributes to calculate the Rarity Score RS. In this way, the Rarity Score RS represents the statistical significance, i.e., the rarity, of at least a portion of the user's Fit Attributes. The Rarity Score RS can be represented as a set of percentages, ratios, symbols, or the like. In some embodiments, the Rarity Score RS can be consolidated into a single percentage, ratio, symbol, or the like. In some embodiments, a higher Rarity Score RS may indicate more scarcity and a lower Rarity Score RS may indicate less scarcity. Those skilled in the art will appreciate that, in general greater scarcity often results in a higher demand and, thus, an increased value or price for the digital asset.

Step 828 comprises generating a digital object, such as the digital object 636 illustrated in FIG. 6, based on the Fit Attributes FA. In some embodiments, the digital object 636 is an avatar or character having various traits or features corresponding to one or more of the Fit Attributes FA. For example, the digital object 636 may be a cartoon representation of a golf ball on a tee having a plurality of traits, e.g., eye color, eye shape, eyebrow color, eyebrow position, mouth color, mouth type, background color, and accessories, among others. One or more of the plurality of traits may correspond to or be influenced by the Fit Attributes FA and the Rarity Score RS, such that a higher Rarity Score RS results in a more unusual or unique digital object. For example, unusual eye colors, such as neon orange, may correspond with an extremely high Rarity Score RS that indicates an extremely scarce Fit Attribute FA. Accordingly, the Fit Attributes FA and the Rarity Score RS can be provided as inputs to the virtual object generator 412 to produce the digital object 636. In some embodiments, the digital object 636 is stored in memory on the user device 632, or computing device 110, 608, or one or more servers 120 and accessed via an address, e.g., a URL.

Step 832 comprises minting a FitNFT, i.e., a digital asset comprising a digital object authorized by a non-fungible token, to a blockchain 628 (see FIG. 6) with the digital object 636 generated as part of Step 828. The blockchain 628 can be a public blockchain or a private blockchain, as described previously herein. Step 836 comprises offering the FitNFT to the user 604 for purchase at a pre-market price, which may be a predetermined price that is set agnostically with respect to the Rarity Score RS. In this way, the user 604 is provided with the opportunity to purchase the FitNFT at what may often be a floor price, i.e., the minimum price available for a digital asset. In some embodiments, the FitNFT is offered to the user 604 prior to publishing the FitNFT on a digital marketplace or platform. Step 840 comprises transferring the FitNFT to the user 604. As described in connection with the process 500 of FIG. 5, the user 604 is provided with a private key that is unique to the FitNFT. Accordingly, the user 604 may access the FitNFT on the blockchain 628 through the user's digital wallet 640. Subsequently and optionally, the FitNFT may be published on the digital marketplace with the Rarity Score RS and digital object 636, such that third parties can bid on the FitNFT in consideration of the published Rarity Score RS and the digital object 636, if desired by the user 604.

In this way, the user 604 is provided with custom fitting process that can be performed virtually and, in some instances, directly with the Brand, which can ensure quality. The user 604 is provided with the Fit Report separately from an NFT, so the user can access the Fit Data FD as needed. The FitNFT is generated based on the Fit Data FD in comparison with market Fit Data FD in the market, but the Fit Data FD itself need not be stored within the FitNFT. The FitNFT is offered to the user at a floor price, which may be an opportunity for the user to realize gains due to fluctuations in the market value of the FitNFT after it is offered to third parties on the digital marketplace.

In some embodiments, any suitable computer readable media can be used for storing instructions for performing the functions and/or processes described herein. For example, in some embodiments, computer readable media can be non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media.

The above-described aspects of the processes of FIGS. 5, 7 and Scan be executed or performed in any order or sequence not limited to the order and sequence shown and described in the figures. Also, some of the above aspects of the processes of FIGS. 5, 7 and 8 can be executed or performed substantially simultaneously where appropriate or in parallel to reduce latency and processing times.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method of golf club fitting, the method comprising:
providing a fitting system including a computing device having a processor that is in communication with a blockchain over a communication network, at least one sensor, and at least one golf club;
collecting, by the sensor, fit data associated with a user and the at least one golf club;
transmitting the fit data to the processor;
receiving, by the processor, inputs from a graphical user interface (GUI) for customizing the at least one golf club:
generating, by the processor, a non-fungible token including metadata and a digital object based on the inputs and the fit data;
configuring, by the processor, the non-fungible token to include at least one function;
minting, by the processor, the non-fungible token to the blockchain; and
triggering, by the processor, the at least one function.

2. The method of claim 1, wherein the fit data is captured by the at least one sensor as a user swings the golf club.

3. The method of claim 1, wherein the at least one function of the non-fungible token includes executing a commission amount.

4. The method of claim 1, wherein triggering the at least one function includes linking the non-fungible token to a purchase of a golf club or set of clubs and updating the metadata.

5. The method of claim 1, wherein the fit data includes a time, a date, fitter information, and user information.

6. The method of claim 1, wherein the blockchain is private.

7. The method of claim 1, wherein the non-fungible token is transferred to a user.

* * * * *

UNITED STATES PATENT AND TRADEMARK OFFICE
CERTIFICATE OF CORRECTION

PATENT NO. : 12,296,243 B2
APPLICATION NO. : 17/747226
DATED : May 13, 2025
INVENTOR(S) : Michael T. McDonnell Page 1 of 1

It is certified that error appears in the above-identified patent and that said Letters Patent is hereby corrected as shown below:

In the Specification

Column 11, Line 61, "(3r d)" should be --$3^{rd}$--.

Column 26, Line 13, "Scan" should be --8 can--.

Signed and Sealed this
First Day of July, 2025

Coke Morgan Stewart
*Acting Director of the United States Patent and Trademark Office*